Figure 1:
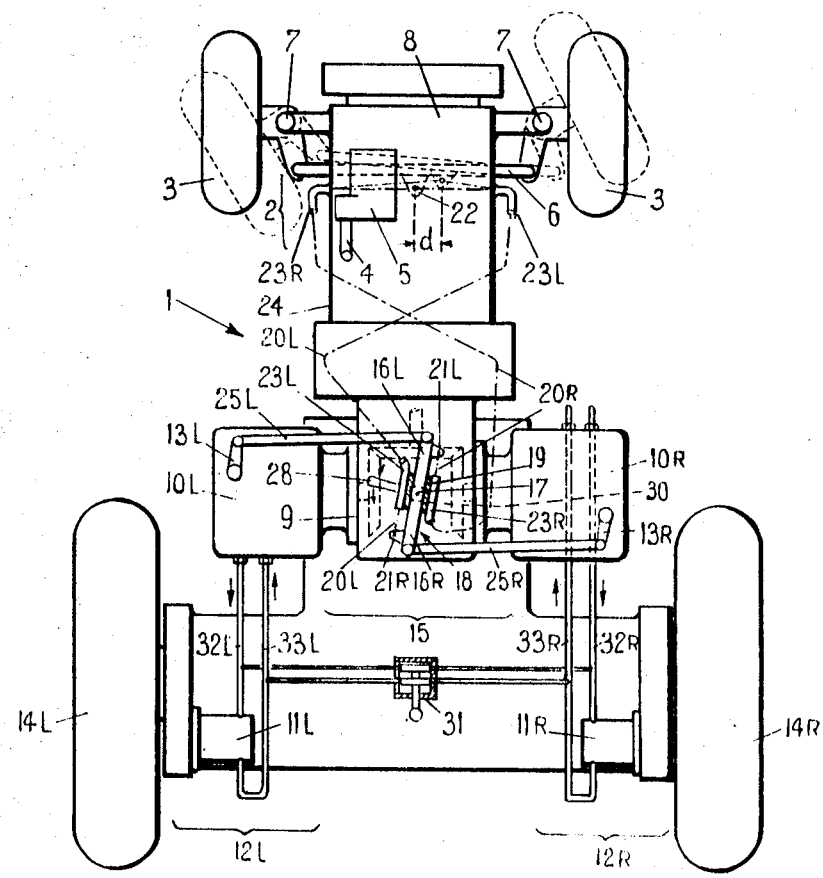

United States Patent

[11] 3,612,199

| [72] | Inventor | Herbert Vissers<br>Nieuw-Vennep, Netherlands |
|---|---|---|
| [21] | Appl. No. | 854,966 |
| [22] | Filed | Sept. 3, 1969 |
| [45] | Patented | Oct. 12, 1971 |
| [73] | Assignee | Landbouwwerktuigen Machinefabriek H. Vissers N.V.<br>Nieuw-Vennep, Netherlands |
| [32] | Priority | Sept. 9, 1968 |
| [33] | | Netherlands |
| [31] | | 68.12831 |

[54] VEHICLE
6 Claims, 4 Drawing Figs.

[52] U.S. Cl. .................................................. 180/6.32, 180/6.48
[51] Int. Cl. ...................................................... B62d 11/04
[50] Field of Search .......................................... 180/6.3, 6.32, 6.48, 6.4

[56] References Cited
UNITED STATES PATENTS

| 2,651,377 | 9/1953 | Lapsley et al. ............... | 18/6.3 |
| 2,774,434 | 12/1956 | Ferris ........................ | 180/6.3 |
| 2,906,356 | 9/1959 | Richard ...................... | 180/6.48 |
| 3,362,493 | 1/1968 | Davis et al. .................. | 180/6.32 |

*Primary Examiner*—Benjamin Hersh
*Assistant Examiner*—Leslie J. Paperner
*Attorney*—Imirie, Smiley, Snyder & Butrum

ABSTRACT: A vehicle having wheels which are each driven by hydraulic gears which are provided with such a control mechanism for controlling the speed of rotation and the relative speed of operation of said driven wheels that the adjustment of the travel direction and the adjustment of the travel speed do not influence each other, resulting in the vehicle having improved steering characteristics.

PATENTED OCT 12 1971

3,612,199

SHEET 1 OF 2

INVENTOR
HERBERT VISSERS

BY *Imicie & Smiley*

ATTORNEYS

PATENTED OCT 12 1971 3,612,199

SHEET 2 OF 2

INVENTOR

HERBERT VISSERS

BY *Imirie & Smiley*

ATTORNEYS

VEHICLE

The invention relates to a vehicle comprising an engine, a left and a right swingable wheel, a left and a right hydraulic gear each consisting of a pump driven by said engine and a hydraulic motor connected to the left and the right driven wheel and comprising a control mechanism for controlling the speed of rotation as well as the relative speed of rotation of said driven wheels.

Such a vehicle is known. The invention provides a vehicle of the above-mentioned kind, in which adjustment of the travel direction and adjustment of the travel speed do not influence each other owing to the fact that the control mechanism comprises a left and a right control member controlling the gear ratio of the left and right hydraulic gear respectively said control members each being swingable about a swing axis and each being connected to one and the same operating member, wherein each control member and its swing axis are movable relatively to each other and the relative movement of the swing axis and the control member concerning the left gear and the relative movement of the swing axis and the control member concerning the right gear are coupled with each other in contrary sense.

If the vehicle according to the invention comprises a steering mechanism for steering the wheel angles of said pair of steering wheels, the relative movement of the swing axis and the control member concerning the left gear and that concerning the right gear are coupled with said steering mechanism in contrary sense.

In this case the steering angle of the swingable wheels as well as the relative speed of rotation of the driven wheels are controlled by means of one and the same operating member.

The invention will be elucidated in the following description with reference to a drawing.

Figure 2:
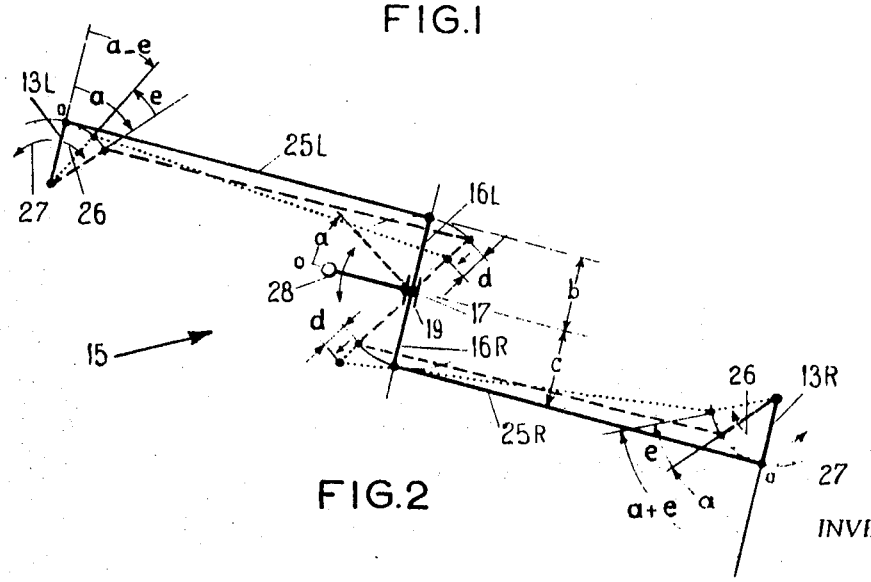
Figure 3:
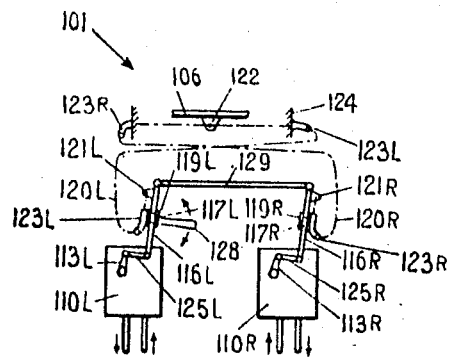
Figure 4:
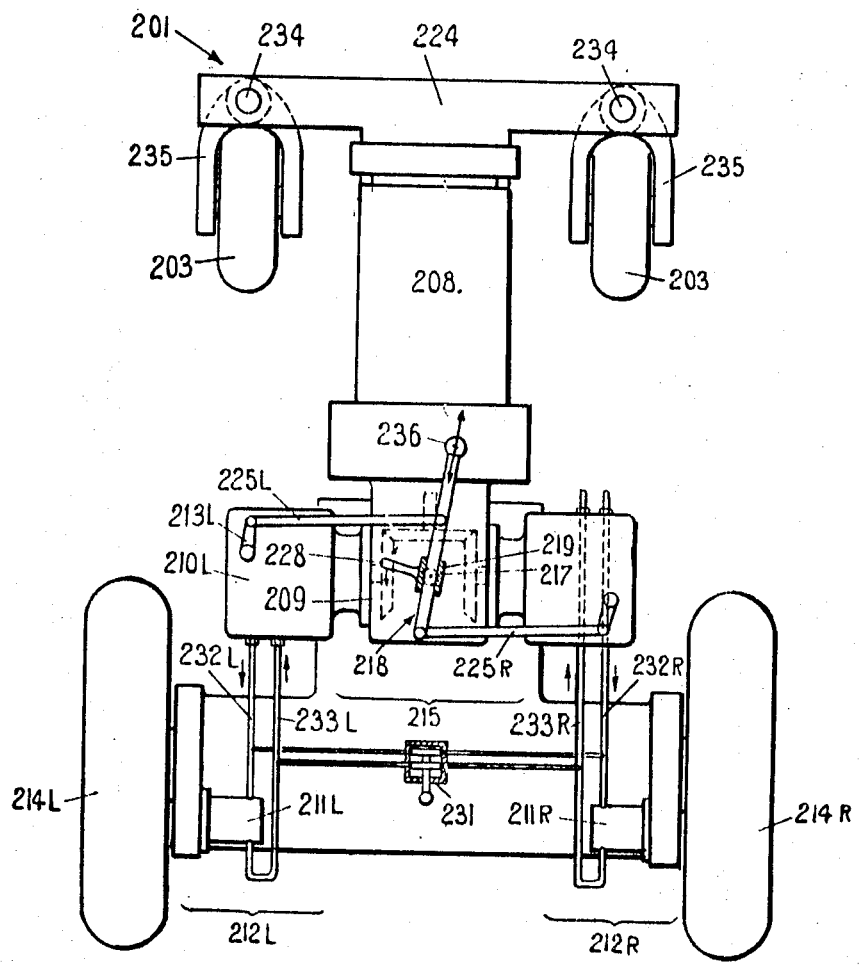

In the drawing represent:

FIG. 1 a plan view of a preferred embodiment of a vehicle according to the invention, FIG. 2 a detail of the vehicle of FIG. 1, FIG. 3 a variant of the detail of FIG. 2 and FIG. 4 another vehicle according to the invention.

The vehicle 1 of FIG. 1, formed by an agricultural tractor, comprises two front wheels 3 steered by means of a conventional steering mechanism 2. The steering mechanism 2 consists of a steering gear 5, operated by a steering wheel axle 4 and moving a rod 6 in transverse direction and so adjusting the steering angle of the front wheels 3 swingable mounted about steering pivot pins 7.

Further the vehicle 1 comprises an engine 8 driving two pumps 10L and 10R of a left and a right hydraulic gear 12L and 12R respectively through a cone gear 9 with equal constant gear ratios, said pumps 10L and 10R being located on either side of said cone gear 9 and being turned over 180° relatively to each other. Further the hydraulic gears 12L and 12R each comprise hydraulic motors 11L and 11R driving the rear wheels 14L and 14R respectively, said hydraulic gears 12L and 12R being connected to the pumps 10L and 10R respectively through feed conduits 32L and 32R respectively and return conduits 33L and 33R respectively.

A control mechanism 15 is provided (FIG. 2) for controlling the pump output and with that the speed of rotation of the rear wheels 14L and 14R. This control mechanism comprises a left control member 16L and a right control member 16R each being swingable about a swing axis 17. The lengths $b$ and $c$ of the control members 16L and 16R respectively are adjustable in contrary sense. To this aim the control members 16L and 16R form part of one and the same rod 18 which is slidably mounted in a block 19, said block 19 being pivotably mounted in the chassis of the vehicle 1 by means of a pivot 30 being concentric with the axis 17.

The sliding movement of the rod 18 relatively to the axis 17 is coupled to the steering angle adjustment of the front wheels 3 by means of bowden cables 20L and 20R extending through tubes 23L and 23R respectively from eyes 21L and 21R respectively connected to the rod 18 to a connecting member 22 of rod 6, said tubes 23L and 23R being connected with their one ends to the chassis 24 of the vehicle in the vicinity of the rod 6 and with their other ends to the block 19. The free ends of the control members 16L and 16R are connected to operating members 13L and 13R respectively of the pumps 10L and 10R respectively by means of connecting rods 25L and 25R respectively.

FIG. 2 shows that the operating members 13L and 13R are deflectable from their neutral position in the direction of arrows 26 and 27 for forward and reverse speed respectively, the pump output and with that the speed of rotation of rear wheels being proportional with the deflection of said operating members. If by manually swinging the operating member 28 fixed to block 19 over an angle $a$, the control mechanism 15 is moved from the position shown with uninterrupted lines in FIG. 2 into the position shown with interrupted lines, the rear wheels 14L and 14R will have the same speed of rotation so long as the vehicle 1 drives straight on.

If, however, in this situation by means of the steering mechanism 2 a steering angle is given to the front wheels 3 owing to a movement $d$ of the rod 6, also rod 18 moves to an extent $d$, so that the control mechanism 15 is put into the position shown in FIG. 2 with dotted lines, in which position the operating members 13L and 13R are deflected over an angle $e$ in contrary sense. The operating member 13L is not deflected from the neutral position to the extent of an angle $a-e$ and the operating member 13R to the extent of an angle $a+e$, resulting in an output of pump 10R being greater than that of pump 10L, whereas the sum of the outputs of pumps 10L and 10R before, during and after this movement of the control mechanism 2 is maintained at a same value.

So adjustment of rod 6 provides a corresponding adjustment of the relative speed of rotation of the rear wheels 14L and 14R. When during driving round a curve, the rod 6 being shifted to the extent $d$, the forward speed of vehicle 1 is increased by deflecting the operating member 28 to a greater extent, the pump 10R delivers a greater additional flow than the pump 10L owing to the control member 16R having a length $c$ which is greater than the length $b$ of control member 16L, resulting in the vehicle 1 keeping with its front wheels 3 as well as with its rear wheels 14L and 14R the same curve. If, e.g., when driving vehicle 1 with great speed on a road, it is required to steer the vehicle 1 only by means of the front wheels 3, the pumps 10L and 10R can be bypassed by opening a valve 31 between feed conduits 32L and 32R and between return conduits 33L and 33R.

Corresponding parts of FIG. 1, 3 and 4 are indicated with the same reference numbers provided, however, that those of FIG. 3 and 4 are increased by 100 and 200 respectively.

In the vehicle 101 of FIG. 3 the pumps 110L and 110R are positioned in the same direction and the operating members 113L and 113R are connected to each other via connecting rods 125L and 125R respectively, via control members 116L and 116R respectively, swingably mounted about swing axes 117L and 117R respectively and via a connecting rod 129. The control members 116L and 116R are slidably mounted in a block 119L and 119R respectively swingable about a swing axis 117L and 117R respectively. An operating member 128 is fixed to the block 119L. Bowden cables 120L and 120R connect control members 116L and 116R respectively to the connecting member 122 of the rod 106. The tubes 123L and 123R of the bowden cables 120L and 120R respectively are fixed with their one ends to the blocks 119L and 119R respectively and with their other ends to the chassis 124 in the vicinity of the rod 106.

In the vehicle 201 of FIG. 4 swingable front wheels 203 are not steered, but they are each mounted for rotation in a frame 235 which is swingable about an axle 234. The control mechanism 215 is substantially identical to the control mechanism 15. In the vehicle 215, however, the rod 218 is not connected to a steering mechanism for steering the wheel angle of swingable wheels 203. These swingable wheels 203 are not steered, seeing they adapt themselves automatically to the relative speed of rotation of the rear wheels 214L and 214R. For adjusting the slide position of rod 218 a manually operable knob 236 is fixed to this rod 218.

The adjustment of the pumps 110L and 110R and of the pumps 210L and 210R correspond with that of pumps 10L and 10R respectively.

I claim:

1. In a vehicle comprising an engine, a left wheel adapted to pivot during steering of the vehicle, a right wheel adapted to pivot during steering of the vehicle, a left driven wheel, a right driven wheel, a left hydraulic pump driven by said engine, a right hydraulic pump driven by said engine, each said pump having lever actuated gear ratio control means, a left hydraulic motor driven by said left hydraulic pump and attached to and adapted to drive said left driven wheel, a right hydraulic motor driven by said right hydraulic pump and attached to and adapted to drive said right driven wheel, and speed control means comprising a rigid lever, pivotable about an axis disposed between the ends of said lever, a first end of said rigid lever being connected by connecting means to said gear ratio control means of said left hydraulic pump and the opposite end of said rigid lever being connected by connecting means to said gear ratio control means of said right hydraulic pump, and means for pivoting said rigid lever about said axis, the improvement comprising:

means for varying the relative speed of said left driven wheel and said right driven wheel, by making said rigid lever and said axis adjustably slidable relative to each other; and operating means to vary the relative position of said rigid lever and said axis, whereby the lever arms of said ends of said rigid lever are altered.

2. In the vehicle of claim 1, the further improvement comprising means for steering the first-mentioned left and right wheels and wherein said operating means are driven by said means for steering to vary the relative position of said rigid lever and said axis.

3. In a self-propelled vehicle having a frame, wheel means supporting said frame including a pair of driven wheels mounted on opposite sides of said vehicle, first and second means for individually driving respective ones of said driven wheels, each said first and second means including speed control means for selectively varying the speed at which its respective driven wheel is driven, and means for actuating said speed control means to vary the speed of said vehicle and for coordinating said speed control means differentially to drive said driven wheels during steering of the vehicle, the improvement wherein said means for coordinating comprises:

lever means having a first point of connection to said first speed control means and a second point of connection to said second speed control means, said first and second points of connection being in spaced relation;

manually controlled means for pivoting said lever means about an axis between said first and second points whereby simultaneously to increase or to decrease the driving speeds of said driven wheels; and means for adjusting the distances of said first and second points from said axis whereby to permit either equalized or differential drive to said driven wheels.

4. In a self-propelled vehicle as defined in claim 2 wherein said wheel means includes a pair of dirigible wheels, said vehicle including means for steering said dirigible wheels, and wherein said means for adjusting is connected to said means for steering whereby automatically to effect differential drive to said driven wheels as the vehicle is steered by said dirigible wheels.

5. In a self-propelled vehicle as defined in claim 3 wherein said manually controlled means includes a block pivotally mounted on said frame about said axis, said lever means is slidably carried by said block, and said means for adjusting slides said lever means within said block.

6. In a self-propelled vehicle as defined in claim 5 wherein said wheel means includes a pair of dirigible wheels, said vehicle including means for steering said dirigible wheels, and wherein said means for adjusting is connected to said means for steering whereby automatically to effect differential drive to said driven wheels as the vehicle is steered by said dirigible wheels.